A. G. PICKARD.
SHUTTER FOR PHOTOGRAPHIC CAMERAS.
APPLICATION FILED OCT. 19, 1912.

1,077,157.

Patented Oct. 28, 1913.
4 SHEETS—SHEET 1.

WITNESSES.

INVENTOR

A. G. PICKARD.
SHUTTER FOR PHOTOGRAPHIC CAMERAS.
APPLICATION FILED OCT. 19, 1912.

1,077,157.

Patented Oct. 28, 1913.
4 SHEETS—SHEET 2.

WITNESSES.

INVENTOR
Arthur G. Pickard

A. G. PICKARD.
SHUTTER FOR PHOTOGRAPHIC CAMERAS.
APPLICATION FILED OCT. 19, 1912.

1,077,157.

Patented Oct. 28, 1913.
4 SHEETS—SHEET 3.

WITNESSES.

INVENTOR
Arthur G. Pickard

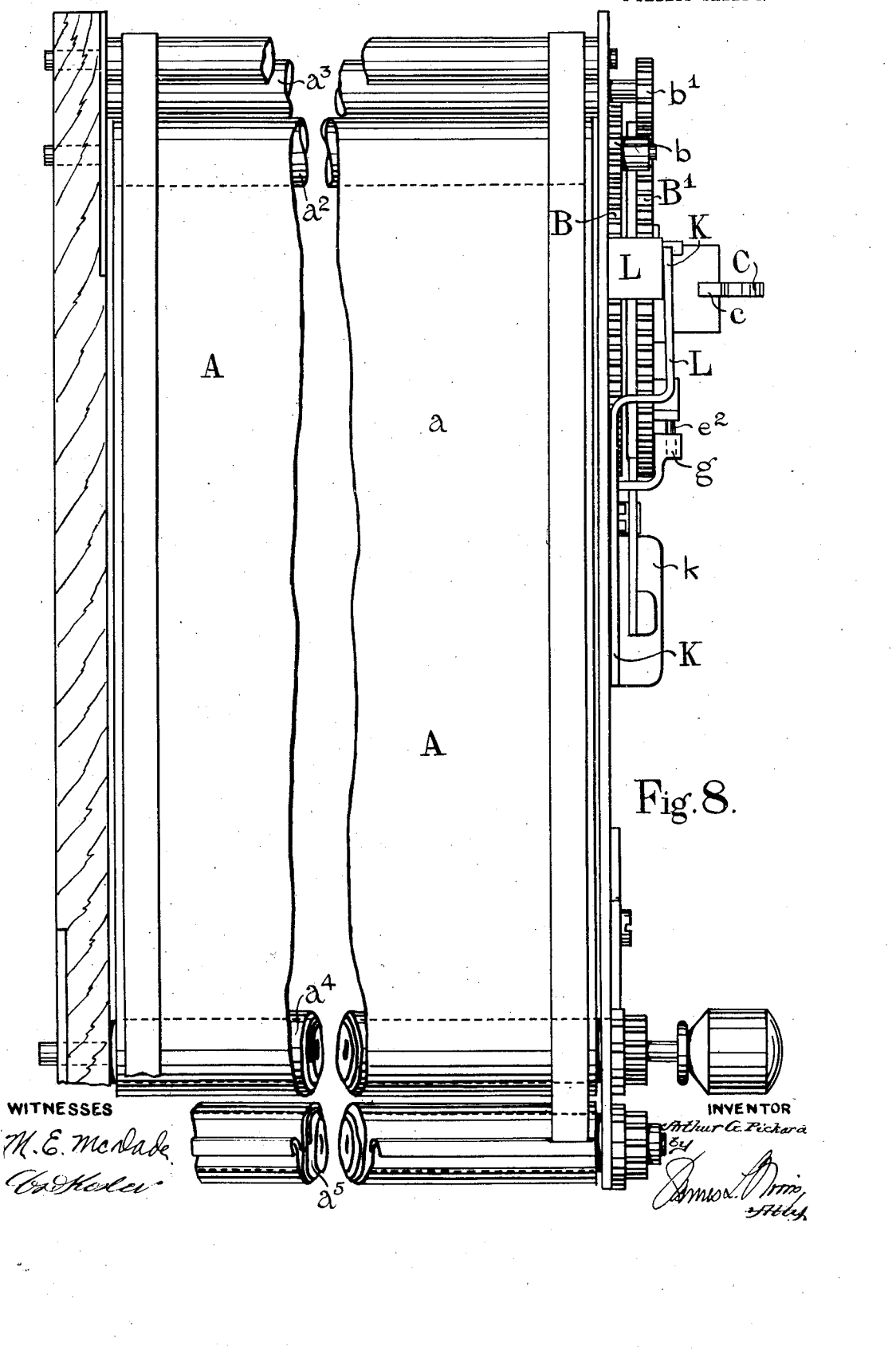

UNITED STATES PATENT OFFICE.

ARTHUR GRAY PICKARD, OF ALTRINCHAM, ENGLAND.

SHUTTER FOR PHOTOGRAPHIC CAMERAS.

1,077,157. Specification of Letters Patent. Patented Oct. 28, 1913.

Application filed October 19, 1912. Serial No. 726,787.

*To all whom it may concern:*

Be it known that I, ARTHUR GRAY PICKARD, a British subject, residing at Altrincham, county of Chester, England, have invented certain new and useful Improvements in Shutters for Photographic Cameras, of which the following is a specification.

This invention relates to mechanism for setting and releasing roller blind shutters known as focal plane shutters in which the width of the slit or aperture in the blind is varied to determine the length of exposure. The aperture is opened as the shutter is being set by the upper blind being caused to move independently a distance corresponding to the desired aperture, and is closed after exposure by the upper blind being caused to independently continue its traverse after the lower blind has been brought to rest and until its lower edge has overlaped the lower edge of the upper blind. In such shutters the upper blind is mounted upon a setting roller at the top of the shutter and has tapes connected thereto which are brought down the sides of the shutter and attached to a spring roller at the bottom of the shutter, and the lower blind is mounted upon a spring roller at the bottom of the shutter and has tapes connected thereto which are brought up the sides of the shutter and are attached to a setting roller at the top of the shutter. The two upper winding rollers carry pinions geared to two setting wheels on a common axle, such wheels being locked together during the exposure movement of the blinds and then unlocked to permit of the closing of the aperture between the blinds.

The object of the invention is to obtain the alteration of the size of the slit, and also the variation between instantaneous and bulb exposure by the single operation of turning the winding knob a less or greater extent, and the invention consists in the construction and arrangement of mechanism for connecting the two setting wheels to cause them to rotate together, and for releasing them to permit of one rotating independently of the other when required.

The invention will be fully described with reference to the accompanying drawings which for the sake of clearness of detail are drawn to a scale double natural size.

Figure 1:
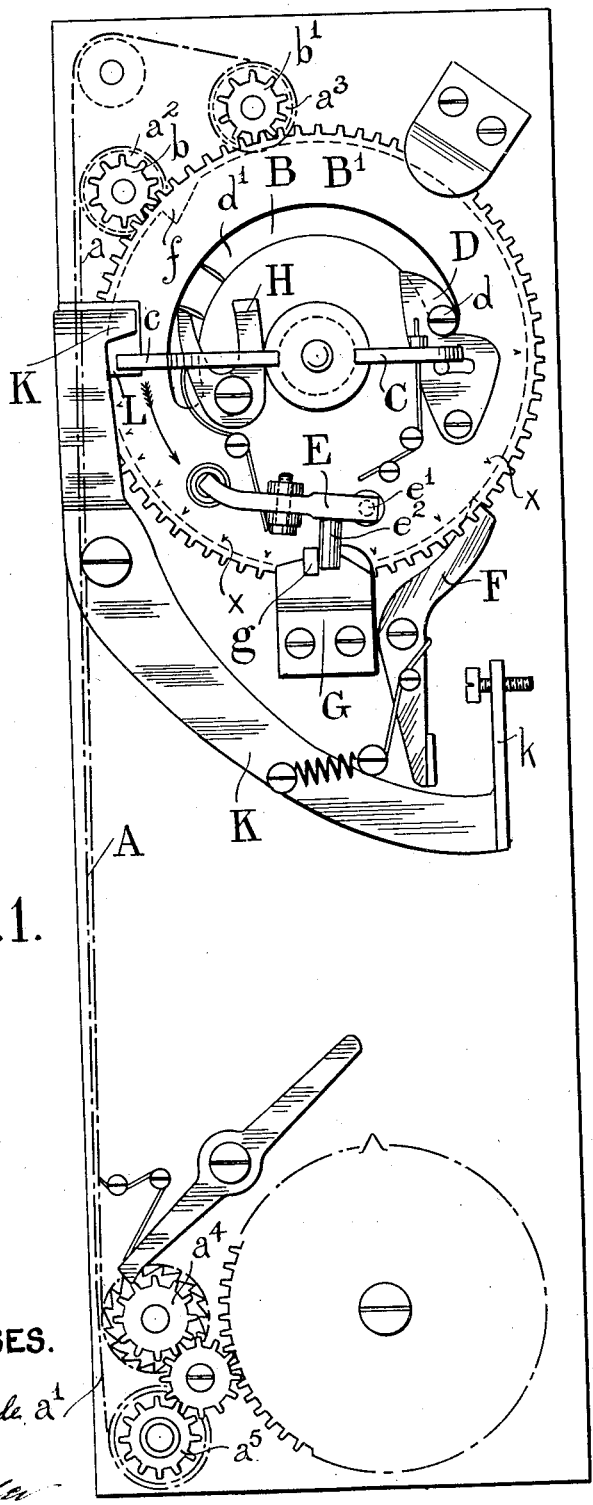
Figure 2:
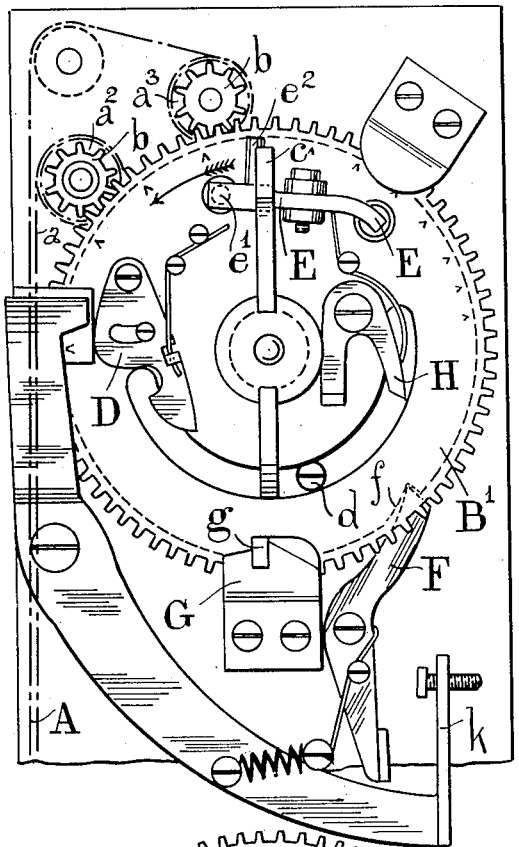
Figure 5:
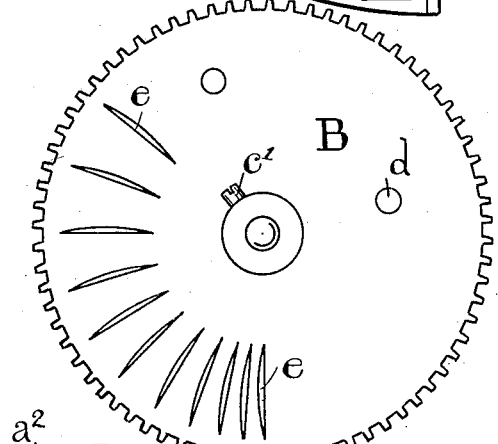
Figure 6:
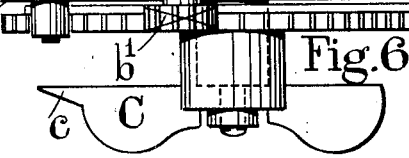
Figure 3:
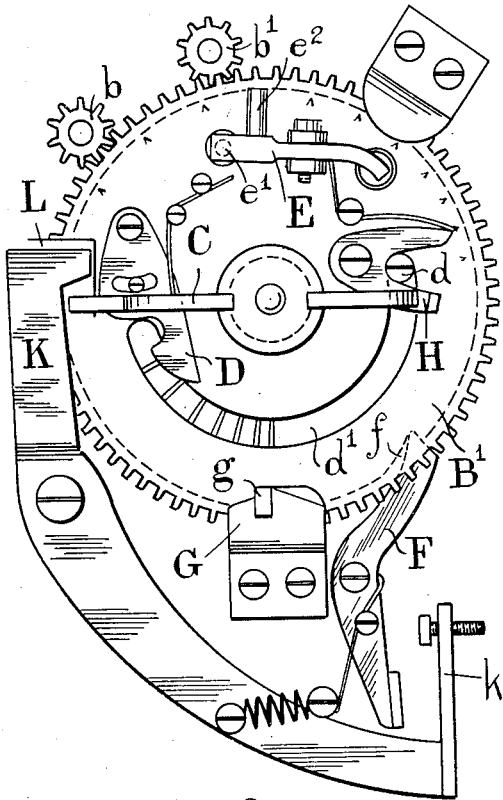
Figure 4:
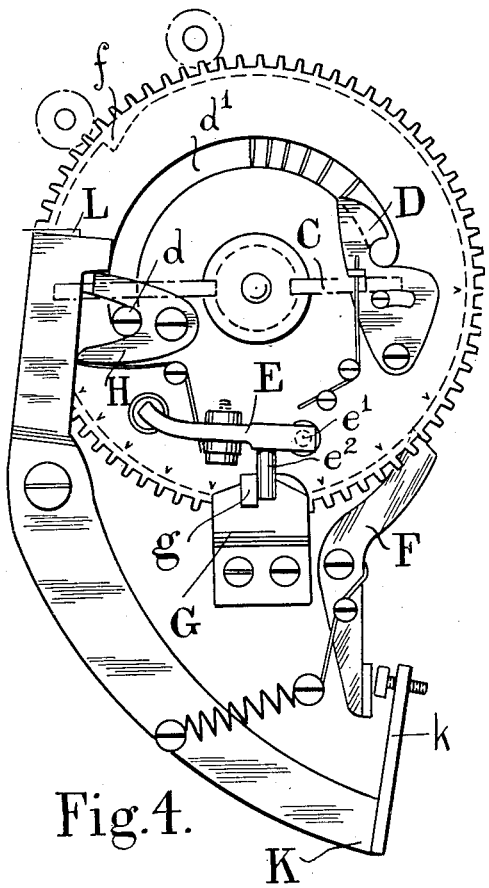
Figure 7:
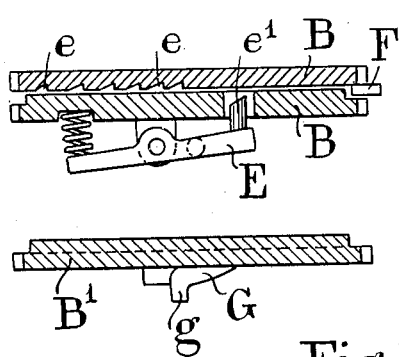

Figure 1 is a side elevation of the shutter mechanism when the blind is closed and not set. Figure 2 is a side elevation of same when the blind is wound up and set for instantaneous exposure. Figure 3 is a side elevation of same when the blind is wound up and set for "bulb" exposure. Figure 4 is a side elevation of same when the blind is open for "bulb" exposure. Figure 5 is a side elevation of one of the setting wheels. Figure 6 is a plan view of both setting wheels. Figure 7 shows details of the setting wheels. Figure 8 is a front elevation of Figure 1.

The blind A is of the ordinary two-part form, the upper part $a$ being attached to and capable of being wound upon the setting roller $a^2$ and connected to the spring roller $a^4$ by tapes; and the lower part $a'$ being attached to the spring winding roller $a^5$ and connected to the setting roller $a^3$ by tapes. The spring winding rollers $a^4$ and $a^5$ act independently of one another but the springs are preferably geared together so as to be tightened and released simultaneously to maintain the springs at the same tension. The setting roller $a^2$ of the upper blind $a$ is fitted with a pinion $b$ and the setting roller $a^3$ of the lower blind $a'$ with a pinion $b'$, which pinions are in gear respectively with two setting wheels B and B'.

The setting wheels B and B¹ are arranged to rotate together for a portion of a revolution, rotating the setting rollers $a^2$ and $a^3$ and setting the upper blind $a$ and the lower blind $a'$ simultaneously, after which the setting wheel B can be rotated to a further extent, and with it the setting roller $a^2$, to set the edge of the upper blind $a$ at any desired distance from the edge of the lower blind $a'$, or in other words to regulate the width of the exposure slit in the blind. The setting wheel B is mounted on a stud $b^2$ and is rotated by a knob C secured to the boss by a pin or screw $c'$. On the face of the wheel B a stud or pin $d$ is affixed, and a number of holes or, preferably, a number of ratchet teeth or indentations $e$ are formed, the purpose of which will be subsequently described. The second setting wheel B' is mounted upon the boss of the wheel B and through it an opening or concentric slot $d'$ is pierced to receive the stud $d$ on the face of the wheel B. A spring controlled catch D is pivoted to the face of the wheel B' adjacent one end of the slot $d'$ to engage the end of the stud $d$ which projects through the slot. A ratchet notch or tooth $f$ is formed in the periphery of the wheel B', with which a releasing pawl F engages to hold it when set against the tension of the springs of the winding rollers $a^4$ and $a^5$. A pawl E is pivoted on the face of the wheel B', and the end $e'$ projects through a hole in the wheel to engage the holes or ratchet teeth $e$ in the face of the wheel B, for the purpose of locking the wheel B, when set to the wheel B', and holding it against the tension of the springs of the winding roller $a^4$ of the upper blind $a$ through the wheel $B^1$ and releasing pawl F.

The pawl E is provided with a projecting pin $e^2$, and an inclined plate G is fitted at one side of the wheel B' over which the pin $e^2$ travels at the end of the rotation of said wheel, to release the wheel B and permit of it being rotated sufficiently to close the slit between the blinds. The rotation of the wheel B' is limited by a stop $g$ against which the pin $e^2$ strikes, or, instead, a stop pin $g'$ may be fitted to wheel B' to engage the stop $g$, and the rotation of the wheel B is limited by the stud $d$ reaching the end of the concentric slot $d'$. On the face of the wheel B' there is also pivoted a U shaped tumbler H which, when the wheel B has nearly made a complete revolution and the stud $d$ reaches the end of the concentric slot $d'$ is caught by the stud $d$, and turned into a horizontal position, to engage a suitably placed stop lever K, to arrest the rotation of the wheels for a "bulb exposure."

At one side of the wheel B' a disengaging piece or stationary block L is fitted, against which the spring controlled catch D contacts when the wheels B and B' have made half a revolution, to disengage the catch from the stud $d$ and allow the rotation of the wheel B to proceed, to further wind up the upper blind to give the desired size or width to the exposure aperture between the edges of the two blinds.

The mechanism before being set and the shutter closed is in the position shown in Figure 1. To set it for instantaneous exposure, the knob C is turned in the direction of the arrow and turns the setting wheel B with it, and the stud $d$ in the slot $d'$, by reason of being caught by the spring catch D, carries the second setting wheel B' around at the same time until they have made half a revolution and the pawl F drops into the ratchet notch $f$. This movement draws the edges of both the upper and lower parts $a$, $a'$ of the blind A across the focal plane without separating them or opening the exposure slit between them. To open the exposure slit and adjust its width, the knob C is turned farther until the pointer end $c$ of the knob C comes opposite one of the index marks $x$ on the wheel B', each succeeding one indicating a wider slit. This movement brings the spring catch D against the fixed block L, by which it is moved backward to release the stud $d$ and thereby allow the setting wheel B to rotate, while the setting wheel B' remains stationary, the stud $d$ moving along the slot $d'$ until it assumes the position shown in Figure 2, (or any position intermediate those shown in Figures 1 and 3.) In this position the pawl E engages the ratchet holes or slots $e$ in wheel B and prevents its rotation in the reverse direction, the wheel B' being the while held by the pawl F. The additional movement of the wheel B draws back the upper blind $a$ to any desired extent, to widen the exposure slit or aperture between the two blinds. To release the blind for exposure, the pawl is withdrawn by the end $k$ of the lever K being pressed against it, or by other means. On the withdrawal of the pawl F and the release of the wheels B and B', said wheels rotate together in the reverse direction until the movement of the wheel B' is arrested by either the pin $e^2$ of the pawl E or the stop pin $g'$ striking the stop $g$. Simultaneously therewith, the pin $e^2$ slides up the incline G, raising the pawl E out of engagement with the ratchet holes or notches $e$ in the wheel B and permitting the latter to continue its movement to bring the two edges of the blind together to close the slit and until the stud $d$ again engages the catch D, when the mechanism is again in position to be re-set for another exposure.

For a "bulb exposure," the knob C, and, with it the wheel B, is rotated beyond the position shown in Figure 2 until it reaches the position shown in Figure 3. In assuming this position the stud $d$ engages the tumbler H and raises it into a horizontal position and retains it there while the wheel is released by the withdrawal of the pawl F. The movement of the lever K to withdraw the pawl throws the other end into the path of the tumbler H and arrests the rotation of the wheel B simultaneously with that of the wheel B' by the stop $g$, and the shutter remains full open so long as the lever is held in that position by the bulb or releasing lever. The movement of the lever L to its normal position frees the tumbler H, and the wheel B continues its travel to close the blind aperture and return to the position shown in Figure 1 in readiness to be reset for another exposure.

What I claim as my invention and desire to protect by Letters Patent is:—

1. In a roller blind shutter, the combination, with an upper blind setting wheel and a lower blind setting wheel, of means for locking the two wheels together comprising a catch on one wheel, a stud on the other wheel engageable by said catch, and a fixed block in the path of the catch by which the catch is operated to release said stud when the wheel has traveled a predetermined distance.

2. In setting and releasing mechanism for roller blind shutters, the combination, with a pair of separate setting wheels for controlling the upper and lower blinds, the upper blind setting wheel having a slot therein, of a catch pivoted to the lower blind setting wheel, a stud engageable by said catch projecting from the upper blind setting wheel through said slot to cause the wheels to rotate together, and a fixed block in the path of the catch to release the stud when the wheel has traveled a predetermined distance, to allow the other wheel to continue its rotation.

3. In a roller blind shutter, the combination, with a setting wheel for controlling and setting the upper blind, and a setting wheel for controlling and setting the lower blind, the latter being provided with a concentric slot, of a catch pivoted to the lower blind setting wheel, a stud projecting from the upper blind setting wheel through said slot, with which stud the catch engages to lock the two wheels together during the setting of the shutter, and a pawl pivoted to said lower blind setting wheel to engage the upper blind setting wheel and prevent its rotation in a backward direction independently of said lower blind setting wheel until the pawl is raised.

4. In setting mechanism for roller blind shutters, the combination, with two setting wheels to control the upper and lower blinds respectively, the upper blind setting wheel being formed with a hole and the lower blind setting wheel being formed with a series of notches, of a spring pawl pivoted to the lower blind setting wheel and projecting through said hole to successively engage said notches, and a fixed inclined piece in the path of said pawl to raise the latter and release the upper blind setting wheel, to permit the further movement of that wheel.

5. In setting and releasing mechanism for roller blind shutters, the combination, with two setting wheels to control the upper and lower blinds, respectively, and means for locking the two wheels together, of a tumbler pivoted to the lower blind setting wheel, a stud projecting from the upper blind setting wheel and engageable by said tumbler, and a pivoted lever in the path of the tumbler to arrest the rotation of the wheels.

6. In a roller blind shutter, the combination with a setting wheel for controlling and setting the upper blind, and a setting wheel for controlling and setting the lower blind, the latter wheel being provided with a concentric slot, of a catch pivoted to the lower blind setting wheel, a stud projecting from the upper blind setting wheel through said slot and engageable by said catch to lock the two wheels together, a pawl pivoted to said lower blind setting to engage said upper blind setting wheel and prevent its rotation in a backward direction independently of the lower blind setting wheel until the pawl is raised, a tumbler pivoted to the lower blind setting wheel to engage said stud, and a pivoted lever in the path of the tumbler to arrest the rotation of the wheels.

In testimony whereof I have hereunto set my hand in presence of two subscribing witnesses.

ARTHUR GRAY PICKARD.

Witnesses:
J. OWDEN O'BRIEN,
GEO. H. O'BRIEN.